May 19, 1959     C. P. PORTERFIELD     2,887,561
CONTROL FOR SPARK MACHINING APPARATUS
Filed June 8, 1956     2 Sheets-Sheet 1
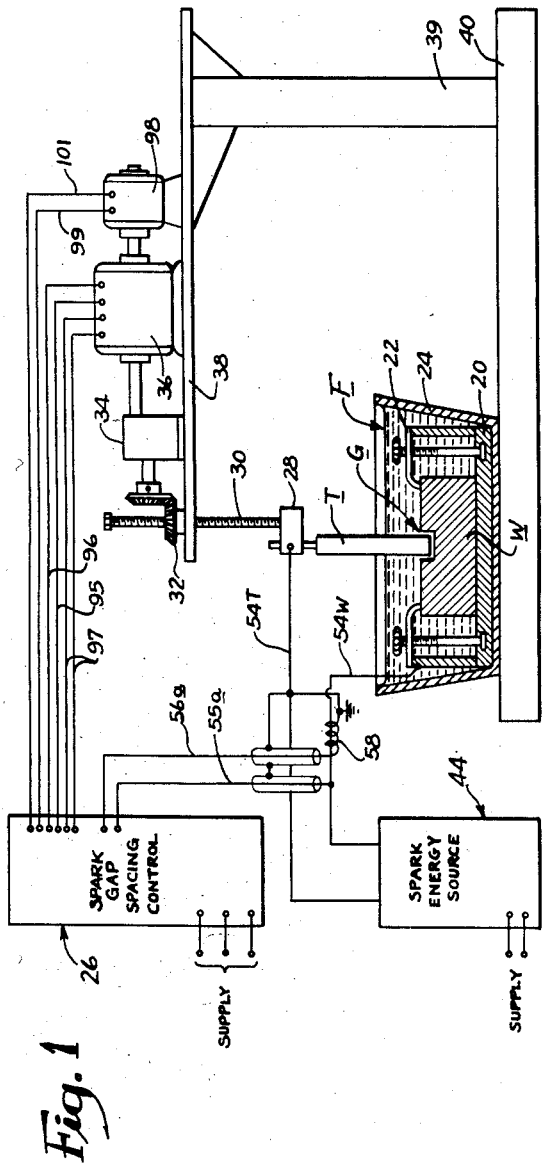
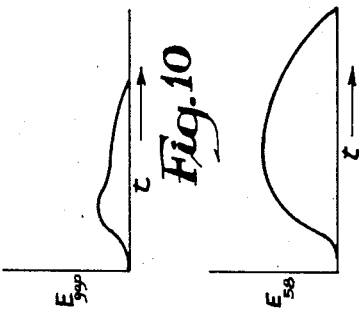
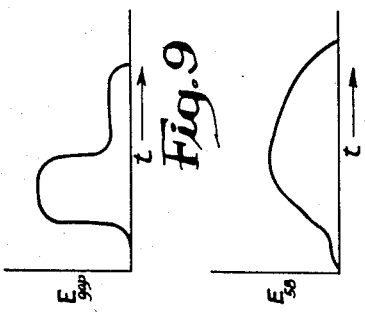
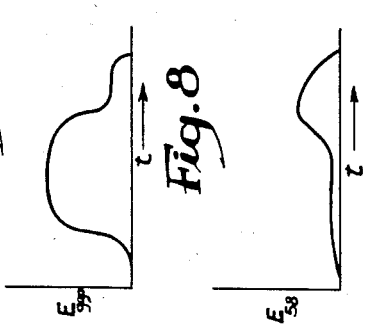
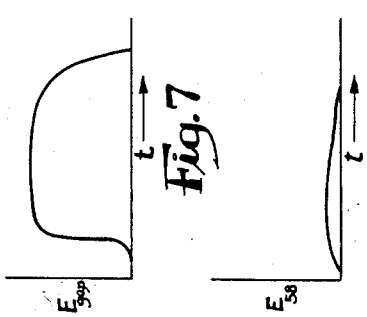
Inventor
CECIL P. PORTERFIELD
by: Carlson, Pitzner, Hubbard & Wolfe
attys.

Inventor
CECIL P. PORTERFIELD

United States Patent Office 2,887,561
Patented May 19, 1959

2,887,561

CONTROL FOR SPARK MACHINING APPARATUS

Cecil P. Porterfield, Pittsburgh, Pa., assignor to Firth Sterling Inc., Pittsburgh, Pa., a corporation of Pennsylvania Application June 8, 1956, Serial No. 590,249

4 Claims. (Cl. 219—69)

The present invention relates generally to the art of spark machining, often referred to as electro-erosion, in which particles of the material of a conductive workpiece are dislodged therefrom by overvoltage initiated, time-spaced, spark discharges through a dielectric medium in a spark gap maintained between an electrode-tool and the conductive workpiece. More particularly the invention relates to the control of the relative positions of the electrode tool and the workpiece so as to maintain the optimum physical spacing therebetween to insure maintenance of the desired operating spark gap.

The speed of cutting or material removal of a workpiece is a primary measure of success of spark machining, for, assuming given standards of accuracy and quality of finish, it is the utility of rapid cutting or material removal which transforms spark erosion from a scientific curiosity to an important industrial tool. To this end, the spark power is increased, high current sparks at high repetition rates producing faster machining. Capacitive energy storage means have been found particularly useful for storing large amounts of energy for discharge of sparks across the continually maintained gap between the electrode-tool and the workpiece. Reference is made to copending United States application of Everard M. Williams, Serial No. 479,472, filed January 3, 1955, for disclosure of an apparatus in which the charging voltage on a capacitor connected across the spark gap rises sufficiently high to ionize the gap and discharge the capacitor at a desired repetition rate. Problems have arisen in the uniformity of charging and discharging of such storage means, particularly in view of the fact that in order to preserve the identity of spark machining and the advantages particularly inherent therein, operational requirements and control of such spark producing systems differ greatly from those of capacitor charging and discharging circuits generally. The requirements are many and include spark discharge in a very short time, preferably in the order of a few microseconds or less, with a very high current value so that a maximum amount of useful energy is provided in each spark. The sparks must be particularly polarized so that the rapid dislodgement of particles is from the workpiece rather than from the electrode-tool. Successive sparks should also be equivalent in current and duration in order that the size and depth of the minute portions of the surface from which the material is dislodged can be controlled. At all times, of course, the identity of the spark must be preserved since degeneration of the spark into a heating arc could provide energy only at the expense of the spark machining process as such.

It will be apparent that in the design of spark machining or electro-erosion devices, one of the most stringent requirements is that the machine be provided with a suitable mechanism for relatively positioning the electrode-tool and the workpiece. This problem includes the method of obtaining information which can be utilized to direct the operation of the means included in the machine for relatively positioning the electrode-tool and the work so as to maintain optimum spark gap spacing. Furthermore, the problem is made more complex by the wide variation in pulse repetition rates and pulse durations which occur in spark machining devices.

It is the object of the present invention to provide means for automatically controlling the spark gap between the electrode-tool and a workpiece continuously for efficient use of the spark machining apparatus. It is a more particular and related object to provide means for automatically insuring the maintenance of the spark gap at a predetermined optimum spacing as determined by the utilization of the applied impulse.

The objects of the invention thus generally set forth together with other objects and ancillary advantages are attained by the construction and arrangement shown by way of illustration in the accompanying drawings in which:

Figure 1 is a diagrammatic representation of a spark machining apparatus embodying the present invention.

Figure 2:
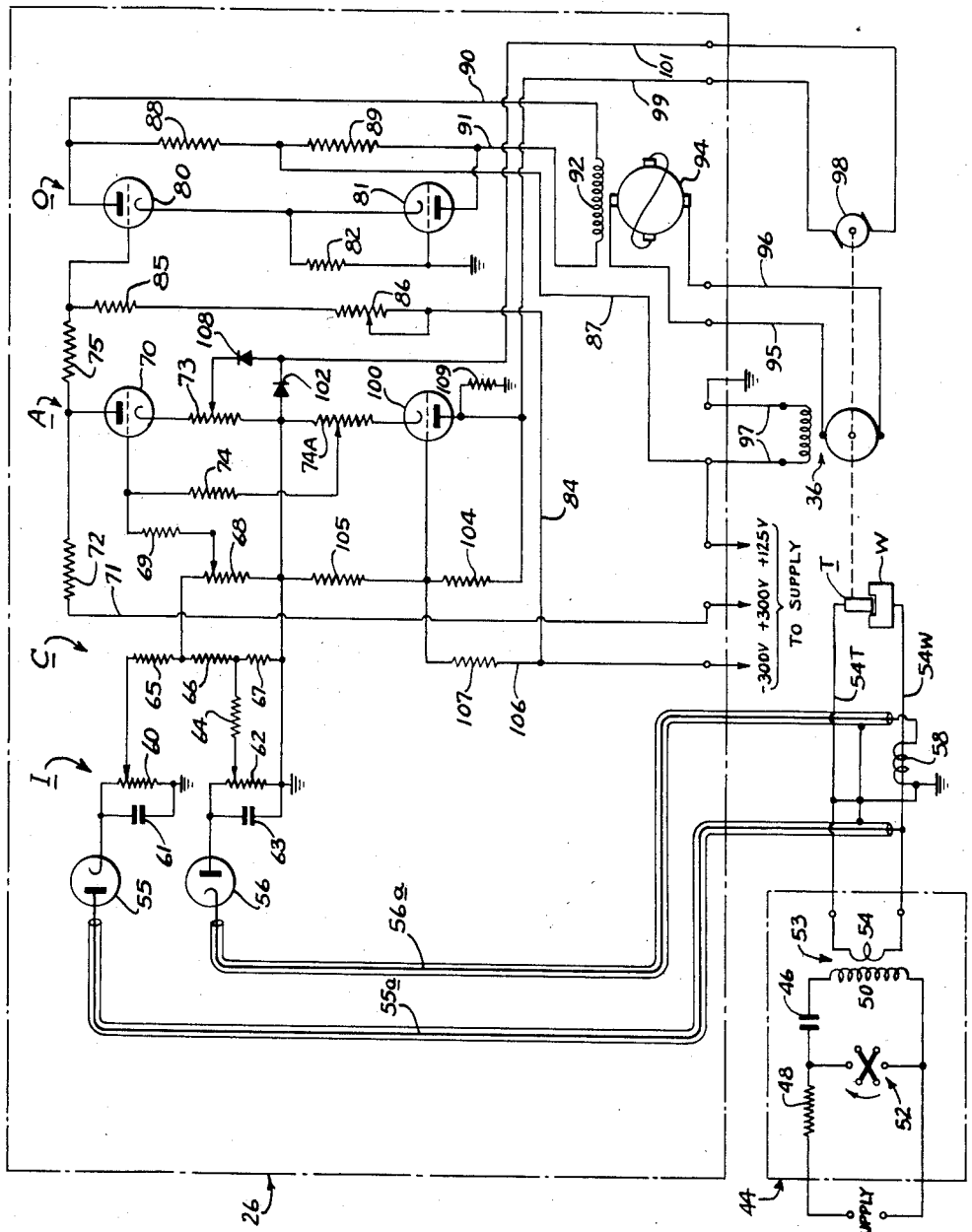
Fig. 2 is a schematic circuit diagram of the electrical components of the apparatus shown in Fig. 1.

Figs. 3–6 inclusive are curves representing spark gap voltages at various electrode-tool to work spacings.

Figs. 7–10 are representative of corresponding voltages appearing across a pickup coil which voltages are proportional to the current that flows in the spark machining lead to the workpiece.

While the invention is susceptible of various modifications and alternative constructions, there is shown in the drawings and will herein be described in considerable detail a preferred embodiment, but it is to be understood that it is not thereby intended to limit the invention to the specific form disclosed. On the contrary, the intention is to cover all modifications and alternative constructions falling within the spirit and scope of the invention as expressed in the appended claims.

Referring more particularly to the drawings, there is shown in Fig. 1 a diagrammatic representation of a typical apparatus for performing a spark machining operation in which the present invention is incorporated. The purpose of this figure is to assist in the understanding of the organization and operation of the apparatus generally. The novel and distinctive manner in which the operational requirements are met by the invention can also be better appreciated from a general consideration which will of course be expanded as the description proceeds. This functional system analysis, however, does not of course indicate that the parts of the system are completely separate and independent.

As shown, a workpiece W is mounted in place with respect to an electrode-tool T for the performance of a spark machining operation thereon. For illustrative purposes the spark machining operation depicted is one in which a hole or bore is to be formed in the workpiece W by repeated, short, high-current spark discharges through a spark gap, indicated generally at G, maintained between the electrode-tool T and the conductive workpiece W. The spark gap G is inundated with a fluid dielectric F. For this purpose the workpiece W is fixed to a base 20, by any convenient means such as screw clamps 22, and the base with the workpiece in place thereon is placed within a tank 24 which serves as a container for the dielectric fluid F.

When as a result of the application of energy impulses to the gap and the dielectric medium F therein is temporarily ionized to permit the passage-over current, the spark discharge effectively removes a minute particle or particles of the workpiece. It will be appreciated that as each spark discharge occurs across the gap to remove some of the workpiece material, the gap spacing is thereby increased. But if the removed particles of material happen to remain in the gap, the spacing might be decreased.

Thus, the electrode-tool must be moved relative to the workpiece to maintain the spark gap spacing within a range in which the spark machining action is most effective.

For this purpose in the illustrative device the electrode-tool T is provided with means for translating it with respect to the workpiece W and with other means for controlling the operation of the translating means. The gap spacing control means is generally indicated by a block outline 26, and for purposes of illustration the feed means is arranged to feed or retract the electrode-tool T. As shown, the electrode-tool T is mounted in a holder 28 which is carried by a feed screw 30. The feed screw 30 is adapted to be rotated by means of a feed nut 32 having integrally formed therewith a bevel gear which serves as the terminal gear of a suitable transmission 34 by means of which the feed screw is operatively coupled to a feed motor 36. The electrode-tool feed mechanism has for convenience been shown as mounted on the cross arm 38 of a supporting structure which includes a column 39 and a base 40. The tank 24 may be conveniently mounted upon the base 40 so as to position the workpiece W, which is disposed therein, in the desired juxtaposed relation to the tool T.

It will be appreciated that the specific form of the electrode-tool and the workpiece may vary widely. For example, the electrode-tool may be of a hollow tubular form or it may be simply of cylindrical rodlike form (as shown) and designed to be axially fed with respect to the workpiece. Other applications might dictate a curvilinear form. But whatever form may be required to produce the desired end result, it will be recognized that the relative positions of the electrode-tool and workpiece should be carefully held since the machining will take place at any given instant across the narrowest part of the maintained gap. In the particular illustrative embodiment the active portion of the gap is designed to be the bottom surface of the electrode-tool T. It will also be appreciated that so long as simple rectilinear movement of the tool is employed the cross-sectional form of the tool may be of any desired configuration, a splined outline or any other non-circular outline being as readily produced as a cylindrical bore. Further, if rotational movement is added the tool may be employed to provide internal or external threads. For purposes of illustration here the various relative postures that can be assumed by the electrode-tool and the workpiece have simply been represented as shown in Fig. 1.

The dislodging of particles from the conductive workpiece W by spark discharge action, as presently understood, is perhaps best explained in terms of electric field force produced by the spark discharge current. Thus, with the workpiece at a positive potential with respect to the electrode-tool, the overvoltage initiated disruptive breakdown of the dielectric fluid F between them causes electronic current flow to the workpiece, or by the usual convention, positive current to the cathodic tool T. Considering the spark terminus on the surface of the workpiece as an approximate point source of current, the current densities at or just under the surface of the workpiece are very high. As a result a substantial electric field gradient is produced along the current path in the workpiece near the surface receiving the spark. This electric field gradient results in a force on the positive ions in the material, and it is this force on that volume of workpiece material that tends to tear it away from the main body of the workpiece. It will be apparent that spark discharge energy must be provided in such a manner that the electrode-tool T is cathodic and the workpiece W is anodic.

For purposes of illustration a spark energy source, generally indicated at 44, is shown connected to the electrode-tool and to the workpiece W respectively by way of the tool holder 28 and one of the hold-down clamps 22. The spark discharge energy source has been shown in Fig. 2 in simplified schematic form. As there shown the spark discharge energy source includes capacitive storage means 46 which is adapted to be charged from a suitable unidirectional power supply by way of a charging impedance 48.

In order to provide timed pulses of energy a pulse forming system is provided which includes the capacitor 46 in series with an inductance 50, together with a rotary spark gap discharge control or switch means 52 for initiating each pulse. The inductance 50 is in fact the primary winding of a pulse transformer 53. In order to discharge the capacitor 46 the switch 52, because of its particularly severe duty requirements involving high voltages, very short circuit-making periods, and high repetition rate, preferably comprises a rotary spark gap having a motor-driven rotary electrode which is adapted to shunt or short circuit the capacitor 46 across the primary winding 50 of the pulse transformer 53 thereby releasing the energy stored in the capacitor 46 through the inductance 50 so as to produce in the secondary circuit of the pulse transformer a polarized unidirectional pulse. The secondary 54 of the pulse transformer is connected respectively to the workpiece W by spark-machining lead 54W and to the electrode-tool T by the other spark-machining lead 54T, in properly polarized relation. It is desirable that the transformer secondary be connected directly through short, minimum inductance conductors to the spark gap electrodes with the secondary winding formed and oriented so that the impulses generated upon the initial flow of discharge current from the capacitor 46 in the winding 50 generates a positive potential on the workpiece W with respect to the tool T. Significantly the transformer is designed for pulse duty and has a high step-down turns ratio.

The foregoing description of the spark discharge energy source is elemental in character and is included merely for the sake of understanding the present invention. For a more complete disclosure including a detailed illustration and description of typical circuitry which can be employed as the spark discharge energy source, reference is again made to application of Everard M. Williams, Serial No. 479,472, filed January 3, 1955.

In accordance with the present invention, relative positioning of the electrode-tool T and the workpiece W so as to maintain the optimum operating gap therebetween is controlled by an amplified signal which is derived as the result of integrating the voltage appearing across the gap between the tool and the workpiece and algebraically adding it to an integrated voltage which is directly proportional to current flow in the gap.

Referring more particularly to Fig. 2 of the drawings it will be seen that the means 26 for controlling the operation of the electrode-tool feed mechanism, which includes the feed motor 36, comprises an integrating section generally indicated by the letter I, a voltage comparison section generally indicated by the letter C, an intermediate amplifier section generally designated by the letter A, and an output section generally designated by the letter O.

The integrating section includes a pair of diode rectifiers 55 and 56. The plate of the rectifier 55 is directly connected by a cable 55a to the spark machining lead 54W in order to apply to the plate the voltage that is impressed upon the workpiece electrode of the spark machining circuit.

The current that flows in the spark machining circuit is detected by the utilization of a current coil 58 which is placed about the same spark machining lead 54W. It will be apparent that current flow in the spark machining lead will cause a voltage to be induced in the coil by means of the inductive coupling therebetween and that the voltage developed across the coil is directly proportional to the current flow in the lead. This coil is connected to the cathode of the rectifier 56 by means of a cable 56a. Preferably the cables 55a and 56a are of coaxial form with their outer conductors connected to the spark machining lead 54T and to machine ground.

The cathode of the rectifier 55 is connected to a parallel arrangement of a resistor 60 and a capacitor 61. The plate of the rectifier 56 is connected to a similar parallel arrangement of a resistor 62 and capacitor 63. Preferably the resistors 60 and 62 comprise potentiometers permitting any portion of the integrated voltages developed across them to ground to be selected as desired commensurate with the desired operating range of the circuit.

The voltage that is selected by positioning the arms of the potentiometers 60 and 62 is applied to a double voltage divider chain which comprises the comparison stage or section C of the control means 26. The voltage divider chain consists of resistors 64, 65, 66 and 67.

The resultant voltage from the comparison section appears at the junction of the resistors 65 and 66 and is developed across a resistor 68 to ground. The resistor 68 comprises a gain control potentiometer and serves to supply the input signal to the intermediate amplifier A. The intermediate amplifier includes a triode 70 to the grid of which the isolation resistor 69 is connected. Plate voltage for the triode may be supplied from any suitable source by way of a lead 71 in which is included a plate resistor 72. The cathode of the triode 70 is connected to ground by way of a resistor 73. Grid bias for the tube 70 is effected by way of a voltage divider including the resistors 74 and 74A.

The triode 70 functions as a D.C. voltage amplifier to produce an amplified input or control signal to the output amplifier section O. Thus the plate of the triode 70 is directly coupled through an isolating resistance 75 to the grid of one-half of a balancing D.C. power amplifier which comprises the output stage O of the control means 26.

The output amplifier includes a pair of grid-controlled hard vacuum tubes 80 and 81 having their cathodes tied directly together and connected to ground through a resistor 82. The grid of the tube 80 has a desired amount of fixed bias applied thereto by way of a lead 84 from any suitable outside source. The lead 84 includes an isolating resistor 85 and a potentiometer 86 by means of which the amount of grid bias can be adjusted as desired. The grid of the vacuum tube 81 is connected directly to ground. Plate supply for the tubes 80 and 81 may be derived from any suitable outside source of positive potential and is applied by way of a lead 87 to the junction between two plate resistors 88 and 89. The opposite ends of these resistors are connected to the respective plates.

As thus described, with the grid of the vacuum tube 81 tied directly to ground, the cathodes of the vacuum tubes 80 and 81 function in substantially the same manner as a cathode-coupled push-pull D.C. power amplifier. The circuit constants are so chosen that the plate voltage of the tube 81 remains substantially constant while the plate voltage of the tube 80 swings above and below that of the tube 81 according to the input signal applied from aplifier stage A to the grid of the tube 80.

It will be apparent therefore that the signal voltage from the output section O of the spark gap spacing control means 26 comprises an electronically amplified signal, and this signal is made available on leads 90 and 91 from the plates of the tubes 80 and 81, respectively. The electronically amplified output signal may be employed to control directly the speed and direction of rotation of a small motor if the mechanical load permits. When the load is larger, further power gain may be obtained by employing the output of the amplifier to excite the field winding 92 of a direct current generator 94 suitably driven by a constant speed motor (not shown). The output voltage of the generator is then applied to the armature of the direct current motor 36 by means of which movement of the electrode-tool T is effected. Preferably the generator 94 is an armature-reaction excited machine having a primary armature circuit carrying the excitation armature current which circuit is completed by short circuiting the armature primary brushes. The output voltage appears across the brushes of the armature secondary circuit and as shown is applied to the armature of the feed motor 36 by way of leads 95 and 96, the motor's field being energized from an external supply by way of the line 97. Thus, a greater degree of amplification obtains for application to the motor 36.

Examining the rectifiers 55 and 56 as connected in the integrating section of the spark gap spacing control means 26, it will be apparent that the rectifier 55 produces an integrated voltage of positive sign and that the rectifier 56 produces an integrated voltage of negative sign. These voltages appear across potentiometers 60 and 62 respectively, the arms of which are connected together through the comparison section C, which consists of the voltage divider chain of resistors 64, 65, 66 and 67, and the junction of resistors 65 and 66 is connected to the top of gain control 68 to the end that the algebraic sum of the voltages selected by the positioning of the arms of potentiometers 60 and 62 appears across the gain control.

When the operating gap G between the tool T and the workpiece W is such as to define an open circuit condition, that is, when the electrode-tool is sufficiently far away from the workpiece W that the applied voltage is insufficient to ionize the dielectric F between the electrode-tool and the work, no current will flow in the spark machining leads 54W and 54T. As a result of this, only rectifier 55 will conduct and the voltage applied to the gain potentiometer 68 is of positive sign. The open circuit gap voltage applied to the rectifier 55 is essentially constant throughout the duration of time that power pulse is applied from the spark discharge energy source.

Regardless of the open circuit voltage, when the electrode-tool T is moved sufficiently close to the workpiece W to allow the operating gap to "fire," the gap voltage after ionization of the dielectric F reduces to approximately 22 volts. The spacing between the electrode-tool and the workpiece governs the time that a fixed value of voltage must be applied to effect ionization. This varying voltage applied to the rectifier 55 determines the voltage that is developed across the potentiometer 60. It will be apparent that the wider the spacing between the electrode-tool T and the workpiece W, the greater will be the time required to effect ionization and, correspondingly, the greater is the value of the voltage appearing across the potentiometer 60. This variation determines the amount of signal produced by this portion of the integration section I. To summarize, the voltage produced is maximum with an open circuit operating gap and is minimum when the gap is short circuited. In Figs. 3, 4, 5 and 6, gap voltages, $E_{gap}$, during varying tool to electrode spacing is illustrated with respect to time $t$. Fig. 3 represents an open circuit gap voltage. Fig. 4 is representative of voltage developed by an energy pulse supplied from the spark discharge energy source 44 which "fires" the gap near the end of the energy pulse. Fig. 5 is representative of gap voltage with respect to time for an energy pulse which "fires" the gap relatively earlier; and Fig. 6 represents the gap voltage with respect to time for a short circuited gap. It will be noted by comparison of these figures that the open circuit operating gap provides the maximum signal across the potentiometer 60. Only a slightly reduced signal across this potentiometer is produced by a pulse which "fires" the gap near the end of its duration, that is to say with a somewhat less gap spacing than that for the open circuit conditution but sufficient for dielectric ionization and spark discharge. Closer spacing of the electrode-tool and the workpiece W results in a greatly reduced signal across the potentiometer 60 as is shown in Fig. 5. Under short circuited conditions it is apparent (Fig. 6) that only the voltage drop in the leads 54W and 54T connecting the electrode-tool T and the workpiece W with the spark discharge energy source 44 is present to provide a voltage drop across the potentiometer 60 and thus minimum signal is developed.

The rectifier 56 operates as a result of the voltage induced in the coil 58 which is inductively coupled to the workpiece lead 54W of the spark machining circuit. Maximum voltage appears across the coil 58 when the operating gap is shorted, and minimum or zero voltage appears when the operating gap is open circuited. The voltages, $E_{58}$, developed across the coil with respect to time $t$ with varying operating gap spacings are illustrated in Figs. 7, 8, 9 and 10. Thus in Fig. 7, coil voltage $E_{58}$ for open circuit condition is shown; Fig. 8 shows coil voltage where the gap is "fired" near the end of the energy pulse from the spark discharge energy source; Fig. 7 illustrates coil voltage when the gap "fires" near the start of the pulse from the spark discharge energy source; and Fig. 8 is representative of coil voltage for a short circuited gap.

It will be apparent to one skilled in the art that the current in the gap and the voltage developed across the terminals of the coil 58 are of the same wave form.

Further, it will be apparent that the rectifier 56 which is connected to the coil 58 causes a negative voltage to be developed across the potentiometer 62. This negative voltage is proportional to the duration and magnitude of current flow in the spark machining lead 54W between the spark discharge energy source 44 and the workpiece W.

It will be noted that the voltage developed across the potentiometer 60 is a maximum with an open circuit operating gap and minimum when the gap is short circuited. The voltage developed across the potentiometer 62 is minimum with an open circuit gap condition and maximum when the operating gap is short circuited. Because of the arrangement of the rectifiers 55 and 56, these voltages are of opposite sign, and when they are added algebraically by the comparison section C of the control 26 the result is the provision of smoothly varying resultant signal voltage which is indicative of the electrode-tool to workpiece spacing of the operating gap G.

The output signal of the comparison stage C, then, is applied to the intermediate amplifier A and the signal resulting therefrom is utilized to control the signal from the output stage O. The latter signal voltage effects control of the operation of the feed motor 36 of the spark machining device, whether the leads 90 and 91 are directly connected thereto or the signal voltage is further amplified as by the interposition of the D.C. generator 92, 94 with the signal voltage from the output stage O exciting the field thereof. Preferably the circuit constants of the amplifier stages A and O are chosen to provide substantially higher voltage gain than normally would be required in order to effect increased response time and maximum sensitivity.

Feedback is provided in the spark gap spacing control 26 and is utilized for stabilization. As shown the instant device includes a tachometer generator 98 from which the feedback signal is derived. The feedback generator is directly coupled to the feed motor 36 so as to be driven thereby, and it is so connected electrically that when the motor 36 is operated to cause withdrawal movement of the electrode-tool T with respect to the workpiece W, a positive signal is applied by way of a lead 99 to the plate of a hard vacuum tube 100 here shown in the form of a triode. The other or negative terminal of the feedback generator 98 is then connected to machine ground by way of a lead 101 and rectifier 102. The plate voltage for the tube 100 is derived from a voltage divider which includes resistors 104 and 105 in series the far end of which is grounded. The tube 100 is provided with a fixed negative delay bias supplied to its grid from the external power supply for the device by way of a lead 106 which includes an isolating resistor 107 and which is connected to the junction between the resistors 104 and 105 and thence to the grid of the tube 100.

When the drive motor 36 receives a signal from the output stage O of sufficient magnitude to cause it to rotate at a predetermined rate to effect retraction of the tool T with respect to the workpiece W, the feedback generator 98 provides a voltage proportional to the motor's speed. The delay bias is preferably so chosen that the compression due to the feedback signal begins to occur at approximately 70% of rated motor speed, thereby allowing rapid acceleration to maximum withdrawal velocity prior to the time negative feedback is applied. Feedback control during motor reversal is carefully designed to be effective only near the top of the motor's rated rotational speed and serves as a speed limiting means effective only at the top of the speed range. When the output stage O provides a signal to effect motor rotation in the opposite direction, feedback is continuously applied in the form of a positive voltage on the lead 101 feeding through a rectifier 108 to the arm of the cathode potentiometer 73 for the tube 70 of the amplifier stage A. The potentiometer 73 permits of adjustment to cause the feedback signal to effect compression at a predetermined point in the range of the rated rotational speed of the drive motor 36. This adjustment has been found to be of considerable value in assisting in compensating for the mechanical period of the complete servo loop. The return path to ground in this instance is by way of a resistor 109 which is interposed between the plate of the tube 100 and ground, the resistor acting as a voltage divider.

Positive feedback is present therefore until the motor is running in the direction dictated by the signal voltage applied from the output stage O. It will be apparent that the feedback voltage assists in effecting rapid reversal and increases the over-all gain of the gap spacing control 26 when the motor is operating at low speeds.

It will be apparent to one skilled in the art that if it is desired to utilize the output of the spark gap spacing control 26 directly to drive a feed motor, without the provision of additional output signal amplification by the inclusion of the D.C. generator 92, 94 then it will be advantageous to replace the illustrative triodes 80 and 81 of the output stage O with pentode type hard vacuum tubes. This change can be effected simply by applying conventional design procedure so as to allow the substitution of pentodes of suitable characteristics. The voltage drive or control signal available to the grid of the output stage O is sufficient to accommodate pentodes of the class that would be utilized should this substitution be made.

The spark gap spacing control described is of the electronic type and employs vacuum tubes. In some applications it may be desirable to use means other than vacuum tubes. For this purpose, it will be apparent to one skilled in the art that the diode rectifiers 55 and 56 can be replaced with selenium, germanium, or silicon rectifiers. If this is done it might be necessary in addition to include additional resistance in series in the lines 55a and 56a in order to provide the desired charge time constant for the capacitors 61 and 63 which are connected in parallel with the potentiometers 60 and 62 of the integrating section I.

Additionally, it is to be noted that the arm of the gain control 68 permits of utilization to feed, by way of a suitable value of the resistance 69, the signal winding of a magnetic amplifier. In this connection reference is made to my copending application Serial No. 645,355, filed March 11, 1957.

The dual input spark gap spacing control concept, it will be seen, is applicable for either electronic or magnetic amplifier control. It is responsive to a wide range of pulse repetition rates and pulse widths as may be derived from the spark energy source and spark machining circuit without requiring a complex system of switching of integrator constants. With the dual input spark gap spacing control the feed motor rotational velocity is automatically adjusted by the levels of the two input signals which are of opposite sign so as to provide a desired motor speed for all feed conditions within the speed range of the motor.

I claim as my invention:

1. In a spark machining apparatus for dislodging particles from a conductive workpiece by overvoltage initiated spark discharges through an ionizable dielectric fluid-filled spark gap defined between the workpiece and an electrode tool, a spark discharge powering circuit for applying a series of short, time-spaced voltage pulses across said spark gap, electrode drive means responsive to the polarity of an input control voltage for advancing or retracting the electrode tool relative to the workpiece to maintain a desired spark gap spacing for which sparkover can occur, and an input control voltage source comprising means coupled to said discharge circuit for deriving a train of first voltage signals each corresponding to the applied instantaneous pulse voltage appearing across the gap, means for integrating said first voltage signals to provide a first control voltage varying from pulse to pulse with changes in the average applied voltage per pulse, means coupled to said discharge circuit for deriving a train of second voltage signals each corresponding to the instantaneous gap current upon sparkover, means for integrating said second voltage signals to provide a second control voltage varying from pulse to pulse with the changes in average current per pulse, and means for algebraically adding the first and second control voltages in polarity to provide a drive control voltage of one polarity when short-circuit discharge current flows and of the other polarity when no sparkover occurs.

2. In a spark machining apparatus for dislodging particles from a conductive workpiece by overvoltage initiated spark discharges through an ionizable dielectric fluid-filled spark gap defined between the workpiece and an electrode tool, a spark discharge powering circuit for applying a series of short, uniform, time-spaced voltage pulses across said spark gap, electrode drive means moving the electrode tool in a direction and speed relative to the workpiece responsive to the polarity and amplitude of an input control voltage for maintaining a desired spark gap spacing for which sparkover can occur, and an input control voltage source comprising means coupled to said discharge circuit for deriving a train of first voltage signals each corresponding to the applied instantaneous pulse voltage appearing across the gap, means for integrating said first voltage signals to provide a first control voltage varying from pulse to pulse with changes in the average applied voltage per pulse, means coupled to said discharge circuit for deriving a train of second voltage signals each corresponding to the instantaneous gap current upon sparkover, means for integrating said second voltage signals to provide a second control voltage varying from pulse to pulse with the changes in average current per pulse, and means for adding algebraically the first and second control voltages to provide a drive control voltage varying from a maximum amplitude of one polarity during applied pulses when short circuit discharge current flows to a maximum amplitude of the opposite polarity during applied pulses when no sparkover occurs.

3. In a spark machining apparatus for dislodging particles from a conductive workpiece by overvoltage initiated spark discharges through an ionizable dielectric fluid-filled spark gap defined between the workpiece and an electrode tool, a spark discharge powering circuit for applying a series of pulses across said spark gap, said impulses being positive-going at the workpiece with respect to the electrode tool, electrode drive means for moving the electrode tool relative to the workpiece at a rate and direction responsive to the amplitude and polarity of an input control voltage to maintain a desired spark gap spacing at which sparkover can occur as the machining proceeds, and an input control voltage source comprising a first circuit including in series a unidirectional conducting device coupled to said discharge circuit for deriving a train of first voltage signals each corresponding to the positive-going instantaneous pulse voltage appearing across the gap, a first integrating capacitor connected to said first circuit for providing a first partial control voltage of one polarity with respect to a potential reference point, a second circuit including in series a unidirectional conducting device coupled to said discharge circuit for deriving a train of second voltage signals each corresponding to the positive-going instantaneous gap current upon sparkover, a second integrating capacitor connected to said second circuit for providing a second partial control voltage of the other polarity with respect to said potential reference point, and a resistance network connected across said first and second capacitors for providing a composite control voltage varying in amplitude and direction with respect to said potential reference point.

4. In a spark machining apparatus for dislodging particles from a conductive workpiece by overvoltage initiated spark discharges through an ionizable dielectric fluid-filled spark gap defined between the workpiece and an electrode tool, a spark discharge powering circuit for applying a series of pulses across said spark gap, said pulses being positive-going at the workpiece with respect to the electrode tool, electrode drive means for moving the electrode tool relative to the workpiece at a rate and direction responsive to the amplitude and polarity of an input control voltage to maintain a desired spark gap spacing as the machining proceeds for which sparkover can occur, and an input control voltage source comprising, in combination, a first partial control voltage circuit coupled to said discharge circuit device for deriving a train of first voltage signals of one polarity each corresponding to the positive-going instantaneous pulse voltage appearing across the gap, a first capacitive integrating means having a unidirectionally conductive input means connected to said first partial control voltage circuit, a second capacitive integrating means having a unidirectionally conductive input means connected to said second partial control voltage circuit, and a resistance network connected across said first and second integrating means for deriving an averaged net voltage therefrom as said input control voltage.

References Cited in the file of this patent

UNITED STATES PATENTS

| 2,794,142 | Steele | May 28, 1957 |

FOREIGN PATENTS

| 1,062,480 | France | Dec. 9, 1953 |

UNITED STATES PATENT OFFICE

CERTIFICATION OF CORRECTION

Patent No. 2,887,561                      May 19, 1959

Cecil P. Porterfield

It is hereby certified that error appears in the above numbered patent requiring correction and that the said Letters Patent should read as corrected below.

Column 10, line 50, after "circuit," insert -- a second partial control voltage circuit coupled to said discharge circuit for deriving a train of second voltage signals of one polarity each corresponding to the positive-going instantaneous gap current upon spark-over, --.

Signed and sealed this 11th day of July 1961.

(SEAL)
Attest:

ERNEST W. SWIDER
Attesting Officer

DAVID L. LADD
Commissioner of Patents